US008606266B1

(12) United States Patent
Mitchell (10) Patent No.: US 8,606,266 B1
(45) Date of Patent: Dec. 10, 2013

(54) AIRBORNE COMMUNICATIONS NETWORK ROUTING

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 135 days.

(21) Appl. No.: 13/112,441

(22) Filed: May 20, 2011

(51) Int. Cl.
*H04W 4/00* (2009.01)

(52) U.S. Cl.
USPC ........... 455/427; 455/431; 455/428; 455/430; 709/227

(58) Field of Classification Search
USPC .................. 455/427, 431, 428, 430; 709/227
See application file for complete search history.

(56) References Cited

U.S. PATENT DOCUMENTS

| | | | |
|---|---|---|---|
| 6,072,768 A * | 6/2000 | Wiedeman et al. | ........... 455/428 |
| 6,529,706 B1 | 3/2003 | Mitchell | |
| 6,614,126 B1 | 9/2003 | Mitchell | |
| 6,741,841 B1 | 5/2004 | Mitchell | |
| 7,187,927 B1 | 3/2007 | Mitchell | |
| 7,280,498 B1 | 10/2007 | Mitchell | |
| 7,343,157 B1 | 3/2008 | Mitchell | |
| 7,483,696 B1 | 1/2009 | Mitchell | |
| 7,496,361 B1 | 2/2009 | Mitchell et al. | |
| 7,599,691 B1 | 10/2009 | Mitchell | |
| 7,761,793 B1 | 7/2010 | Mitchell | |
| 7,865,132 B2 | 1/2011 | Mitchell | |
| 2011/0040973 A1* | 2/2011 | Jonnagadla et al. | .......... 713/170 |

* cited by examiner

*Primary Examiner* — Wayne Cai
*Assistant Examiner* — Chuck Huynh
(74) *Attorney, Agent, or Firm* — Donna P. Suchy; Daniel M. Barbieri (57) ABSTRACT

A data transmission system for transmitting and receiving data comprising a first communication system configured to transmit and receive, data over a first network and a second communication system configured to transmit and receive data over a second network. The second network has a more contiguous physical coverage than the first network. The system further includes a proxy unit configured to select a routing of user data from a user device through either the first communication system or the second communication system. The proxy unit being configured to select the routing based on a user condition. The user condition may be based on a user preference, a detection of a type of user session (e.g., an SSL session), and/or a travel path of the user. A communication system is selected that provides the best network coverage, including continuity, based on the user condition.

20 Claims, 7 Drawing Sheets

AIRBORNE COMMUNICATIONS NETWORK ROUTING

CROSS-REFERENCE TO RELATED APPLICATIONS

This application is related to co-pending U.S. patent application Ser. No. 12/827,632 filed on Jun. 30, 2010 and entitled "Aviation Cellular Communications System and Method," the entirety of which is incorporated herein by reference.

This, application also relates to co-pending U.S. patent application Ser. No. 12/891,107 filed on Sep. 27, 2010 and entitled "Doppler Compensated Communications Link," the entirety of which is incorporated herein by reference.

This application also relates to co-pending U.S. patent application Ser. No. 12/891,139 filed on Sep. 27, 2010 and entitled "Airborne Cell Tower Selection System and Method," the entirety of which is incorporated herein by reference.

BACKGROUND

Air-to-ground (ATG) communications systems, including those disclosed in the listed Related Applications, present certain challenges for providing robust user experiences in all situations. In particular, ATG communications using existing terrestrial cellular networks may present difficulty in maintaining continuous RF connectivity in areas not fully supported by enough cellular base stations or sector coverage. For example, much of the western states, coastal regions, or over-the-water travel paths may not have contiguous or any cellular coverage. Many places have terrestrial coverage gaps as large as 100 miles or more. This problem is amplified with business jet aircraft, as they tend to have their own unique flight paths in contrast to commercial jets which generally have prescribed and/or predictable air lanes that correlate to ground network presence. Hence, a loss of link is highly probable in some areas particularly relying on pre-existing network assets.

This loss of link may be ok where "down time" is in the order of seconds as, a client in session may not detect loss of link for this amount of time and the user device autoconnect feature rapidly reconnects to the next available tower. A more troubling difficulty with a potential loss of link occurs while processing important or secure online information, such as accessing online information through a secure socket layer (SSL) session. Many secure IP transactions monitor IP addresses and will terminate the session if the IP address changes. By connecting, dropping and connecting again, a change in IP address may result. In an SSL sessions, such a change in IP address would require a user to re-enter identification information like a username and password. This is an inconvenience to the user and makes broken IP sessions highly undesirable while in flight.

SUMMARY

In view of the foregoing, the present disclosure presents a data transmission system for transmitting and receiving data. The data transmission system includes a first communication system configured to transmit and receive data over a first, network and a second communication system configured to transmit and receive data over a second network. The second network, which may be inherently less economical, has a more contiguous physical coverage benefit than the first network. The system further includes a proxy unit configured to select a routing of user data from a user device through either the first communication system or the second communication system.

The proxy unit is configured to select the routing based on a user condition. This user condition provides a context in which the communication is taking place and may be based on a user preference, a detection of a type of user session (e.g., an SSL session), and/or a travel path of the user as provided by the aircraft flight system of from the crew or passenger. A communication system is selected that provides the best network coverage, including continuity, based on the user condition. In some situations, this selection may override any cost benefit. As one example, detection of an SSL session may cause the proxy unit to select the communication system with the more contiguous physical coverage.

DETAILED DESCRIPTION

Figure 1:
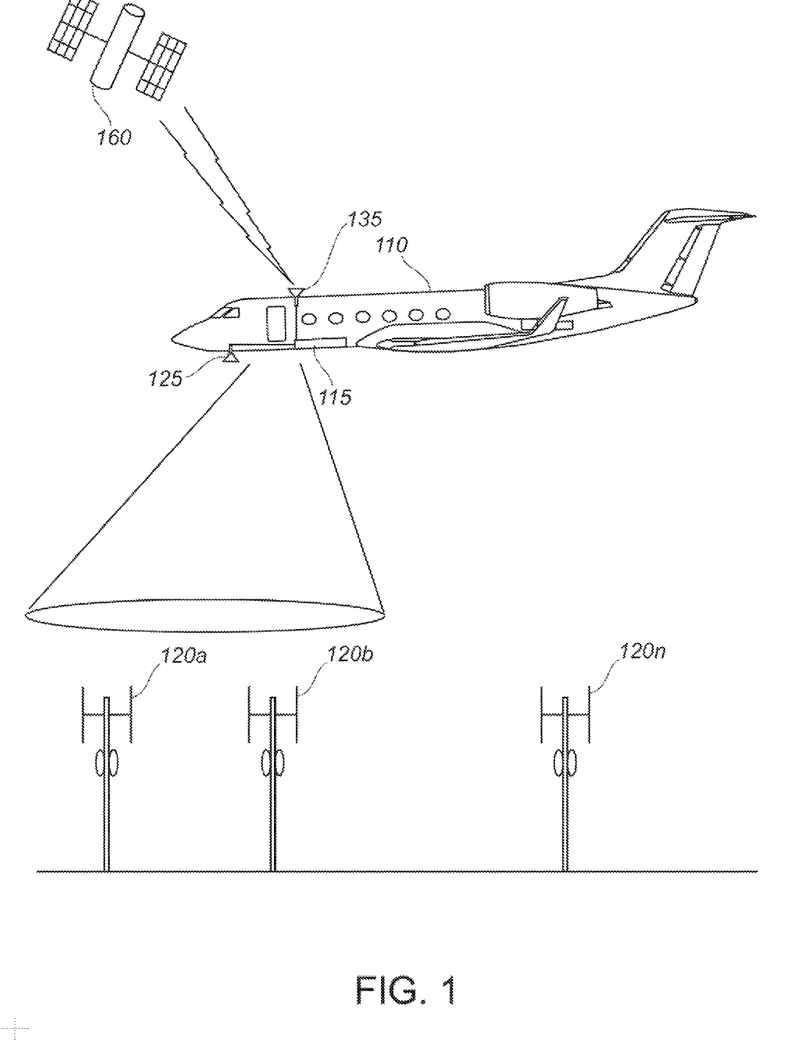
FIG. 1 shows a typical operating environment of the disclosed system and method.

The disclosed method and system proposes the use of two or more airborne communications systems and networks to provide for improved contextual quality of service. FIG. 1 shows a typical operating environment for the disclosed system and method. An aircraft 110 may be equipped with communications avionics 115 that may contain a plurality of communication systems. For example, one communication system may use an air-to-ground network to communicate through antenna 125 to ground base stations 120a-n. For example, such networks may include a commercial 700 MHz LTE cellular network, a proprietary data link operating in an available air-to-ground spectrum, or other commercial air-to-ground networks. Communications avionics may further include a second communications system that uses a satellite communications network, to communicate through antenna 135 to one or more satellites 160. An Inmarsat L-Band is one example of such a communication system. LTE cellular and Inmarsat L-Band are only examples of communication systems applicable for use with the disclosed system method. Any communication system (including global GSM bands and Ka satellite bands), network, protocol, standard, or technique applicable for use in an aircraft may be employed.

Regardless, of which communications systems are, selected for communications avionics 115, one communication system should provide for more total or contiguous physical coverage than the other communications systems for a specific physical area. In this context, a higher level of physical coverage implies that connectivity to such a system is more continuous and freer from connectivity drops given the physical location or planned travel path of communications avionics 115. In this way, the communication system with the largest amount of total or contiguous physical coverage may be selected in circumstances where continuous connectivity is highly desirable. In the example of FIG. 1, the satellite-based network would have a higher physical coverage than the cellular-based ground network.

Oftentimes, communications systems that feature higher levels of physical coverage have drawbacks compared to other communications systems. For example, systems with higher levels of physical coverage, like satellite communications systems, may be more expensive to use and/or may provide for a lower data rate. As such, in situations where continuous connectivity is not a high priority, a cheaper or faster communication system may be used. The following figures describe a system and method for selecting between two or more communications systems so as to best meet a users' desired quality of service (QOS) level.

Figure 2:
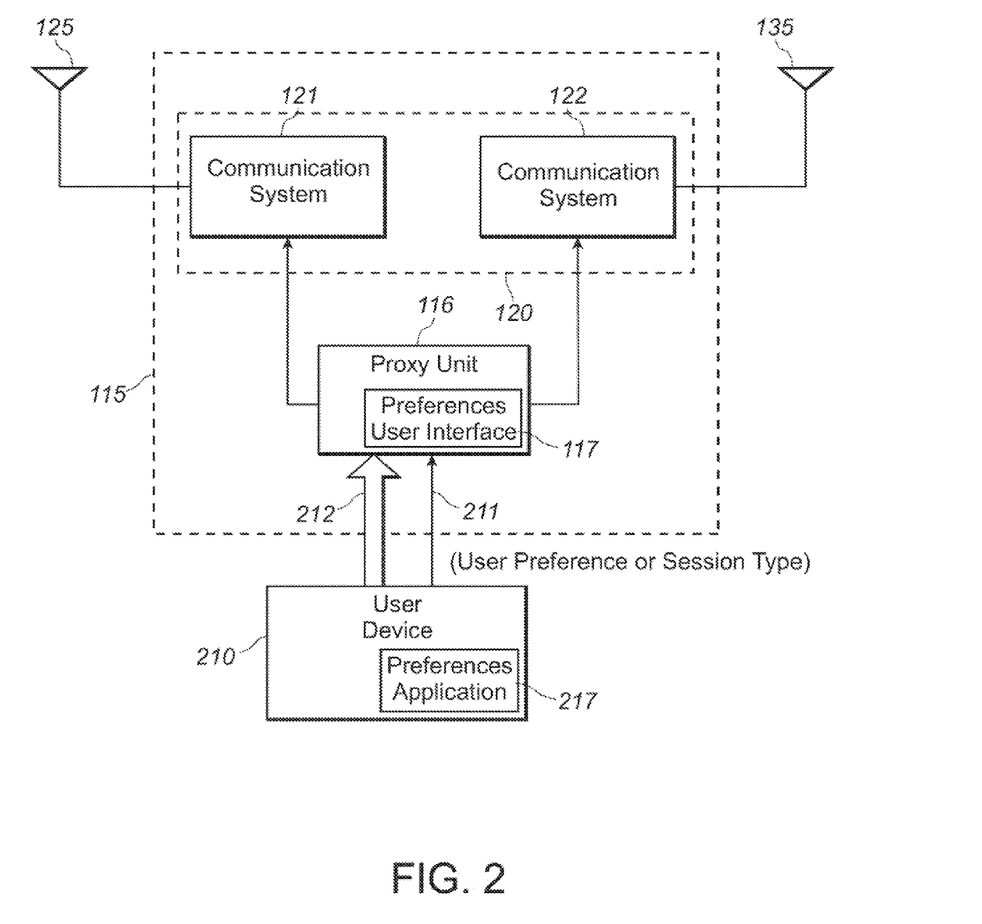
FIG. 2 shows a block diagram according to one embodiment of the disclosed system.

FIG. 2 shows a block diagram according to one embodiment of the disclosed system. Communications avionics 115 may include a plurality of communication systems 120 as well as a proxy unit 116. In this embodiment, communication systems 120 include two separate communications systems 121 and 122. As discussed with reference with FIG. 1, communications system 121 may be, an LTE-based cellular communication system communicating through antenna 125, and communications system 122 may be an Inmarsat L-Band satellite communications systems. As one example, communication system 121 may be implemented as described in co-pending U.S. patent application Ser. No. 12/827,632 filed on Jun. 30, 2010 and entitled "Aviation Cellular Communications System and Method," co-pending U.S. patent application Ser. No. 12/891,107 filed on Sep. 27, 2010 and entitled "Doppler Compensated Communications Link," and/or co-pending U.S. patent application Ser. No. 12/891,139 filed on Sep. 27, 2010 and entitled "Airborne Cell Tower Selection System and Method."

While FIG. 2 shows the two communications systems as separate units, it should be understood that the plurality of communication systems may be packaged or arranged in any manner. As one example, the plurality of communications systems may be packaged together as one software-defined radio capable of communication using a plurality of different communication protocols over a plurality of different networks. An example of a "software-defined radio" is described in U.S. Pat. No. 7,187,927, entitled "Global Cell Phone System and Method for Aircraft," the entirety of which is incorporated by reference herein. This system and method describes a plurality of radios that may be selected from to maintain continuous global coverage. Radios cited include satcom and air-to-ground picocells. These picocells may be extended as part of an air-to-ground system.

In addition, U.S. Pat. No. 6,741,841 (the '841 patent), entitled "Dual Receiver for an Onboard Entertainment System" cites a dual receiver system for satcom and a ground radio link. The '841 patent is also incorporated by reference herein. It is envisioned that the presently disclosed system may be used in a beneficial way in conjunction with the described systems and methods of the '841 patent. The '841 patent also cites a typical global satcom coverage map that may be extended to air-to-ground connectivity options such as GSM, CDMA, LTE, WiMax or future technologies.

Proxy unit 116 connects data traffic 212 of user device 210 to one of the plurality of communications systems 120 based on the context of use of user device 120. As shown in FIG. 2, the context of use is determined by proxy unit 116 through user condition 211. In this embodiment, user condition 211 may be a user preference, may be inferred through a detection of session type, or may be a combination of both. Session type may be detected by filtering and/or indentifying a particular URL as requiring a more continuous quality of service (QOS).

The proxy unit may be implemented as a secure software and server system enabling cache and bandwidth control. The system may include web-based management, may conduct virtual private networks, and may include capability to conduct background virus scans. As an example, the software may be a secure Linux with Squid caching. A proprietary software algorithm may be implemented through preferences user interface 117 to present a home page to the user with custom settings. The server may use this proprietary software to filter website addresses and deliver data to and from optional radio ports according to these settings.

Proxy unit 116 may be configured to identify a URL (e.g., https://) as being an SSL type and/or other high priority IP session and subsequently vector aircraft data communication to a communications systems having a more total or contiguous physical coverage, such as an Inmarsat system of communications system 122. Data may be routed to a low-continuity QOS option, such as LTE-based communications system 121, when need for high-continuity QOS is no longer needed. Examples of low-continuity QOS applications include non-secure data sessions, standard web browsing and other "bursty" applications where data is accessed in short, ad hoc intervals (sometimes due to hard hand-off situations). Examples of high-continuity QOS applications might be secure e-mail, secure banking transactions, secure corporate sites, government sites maintaining a single IP address, streaming video, and other "non-bursty" applications where data is accessed more continuously. This kind of traffic is best placed over satcom or regions having known good "soft hand-off" between commercial cellular towers (e.g., LTE) over regions anticipated in travel.

Figure 3:
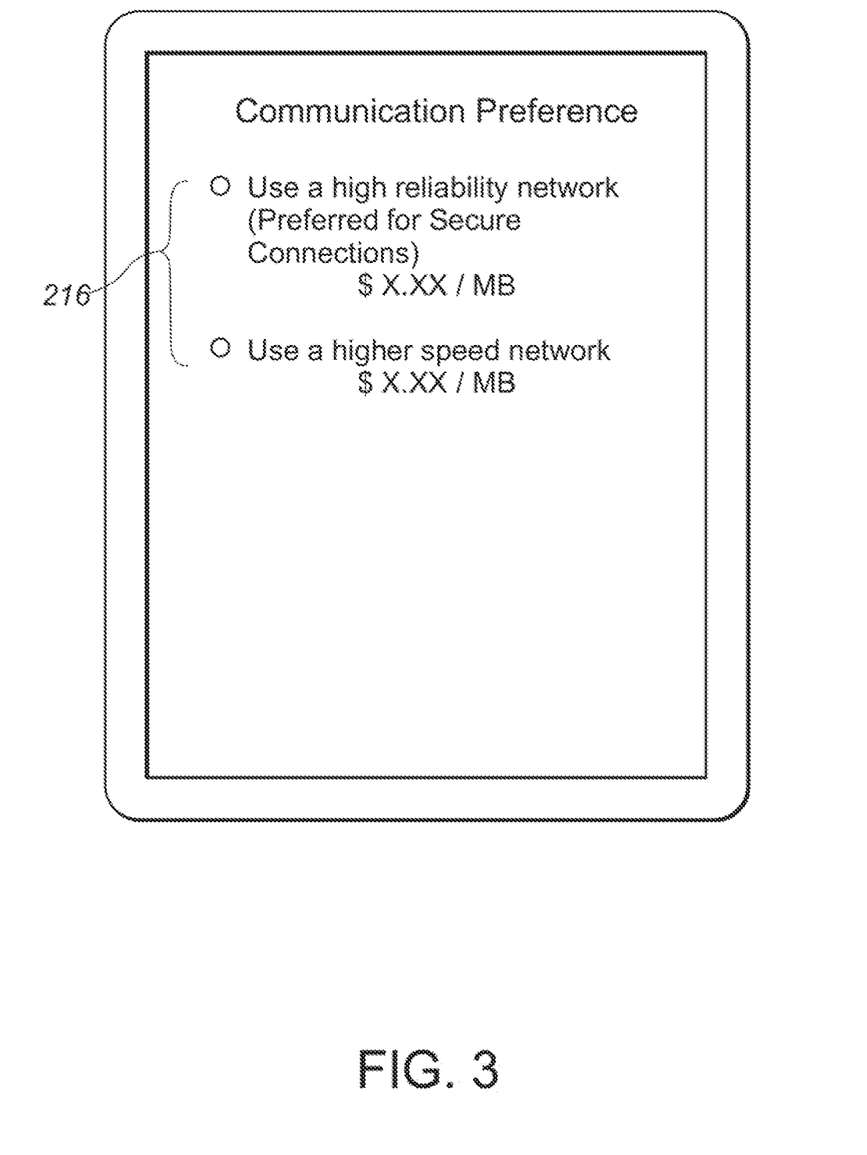
FIG. 3 shows an example user interface for selecting a user preference.

Another way in which proxy unit 116 may determine routing data from user device 210 is through an explicit user preference. FIG. 3 shows an example user interface for selecting a user preference. Such a user interface may be implemented through preferences user interface 117 hosted on proxy unit 116. This user interface may be implemented as a web page. Such a web page may be displayed by the user device itself or through any interactive display on board the aircraft, such as a seatback display. The seatback display may include any type of conventional input device allowing the user to make selections. For example, the seatback display may be a touch screen. It should be noted that each user in the aircraft may make user selection preferences for the routing of their user device independently of each other.

Alternatively, the user device may include a preference application 217 hosted locally to set user preferences. As shown in FIG. 3, user interface 213 may include a plurality of user preference selections 216 that are selectable by a user of the user device. For example, the user may identify a list of websites for which it is important to maintain continuity in connection. The URL of a banking website may be mapped/routed through satcom to prevent adverse effects of any link loss that could occur. Alternatively, or in addition, a user may specify all secure socket links (https:) to be routed through satcom. By enabling default routing through satcom, the user reduces risk of link loss, thus helping to prevent dropped sessions with banks or other important sites (e.g., SSL sites).

In the example shown in FIG. 3, the user preferences include a preference to (1) use a high reliability network (preferred for secure connections) or to (2) use a higher speed network. In this example, selection of user preference (1) would cause the proxy unit to route data through a high-continuity QOS communication system (Inmarsat) and selection of user preference (2) would cause the proxy unit to route data through a low-continuity QOS communication system (LTE). The cost for each service may also be included so that a user may better select a desired communication system based on economical reasons.

In the prior example, the user preferences are presented in a QOS-centric manner so that the user need only understand if they prefer high reliability or higher speed. The actual selection of the appropriate communication system is handled by the proxy unit. The proxy unit may incorporate a proprietary user interface with rules for selecting a communication system. For more sophisticated users, the user preferences may directly select the communication systems. For example, user preference (1) may be "Use Inmarsat" and user preference (2) may be "Use LTE." The following examples present two user preferences. It should be understood, that multiple and/or nested user preferences may be employed based on the composition of the system and the number of difference communication systems employed. Additionally, the user device and/or the proxy unit may be configured with a "Settings" list to maintain a list of websites (URLs) or website types (SSL) likely requiring or requiring higher-continuity QOS.

Figure 4:
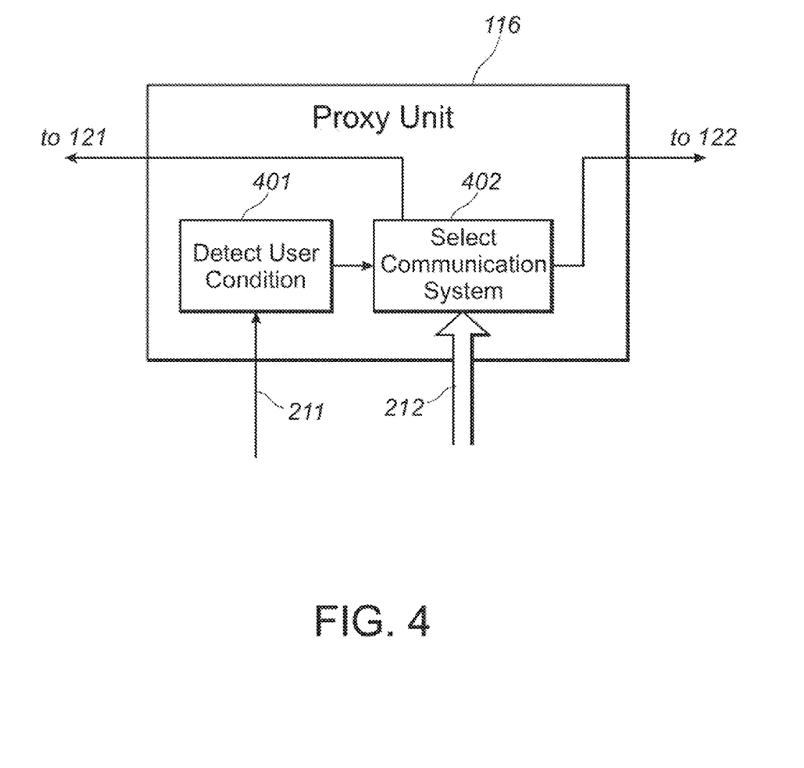
FIG. 4 shows a block diagram of a proxy unit according to one embodiment of the disclosure.

FIG. 4 shows a block diagram of a proxy unit according to one embodiment of the disclosure. As shown in this example, proxy unit 116 may consist of two main functional blocks. Detect user condition module 401 receives the user condition 211 from the user device and determines the particular user condition present in the current context. As described above, the user condition in this embodiment may be a user preference and/or session type. Once the user condition is detected, selection communication system module 402 connects the user device to one of communication systems 121 or 122.

In another embodiment of the disclosed system, the proxy unit May, automatically route data to a particular communication system based on a flight path of the aircraft. The coverage footprint of many ground-based communications systems (e.g., LTE cellular) can be largely dependent on the exact location the user device will be travelling through. For example, a flight path through the eastern United States may travel through a substantially contiguous LTE network, while a flight path through the western United States, coastal regions, and/or over-the-water may, experience substantial gaps in ground-based coverage. As such, in addition to considering user preference and session types, one embodiment of the disclosed-system may also automatically consider the longevity of the intended flight path of the aircraft and a database of network coverage for particular communication system when making the decision on how to route data.

Figure 5:
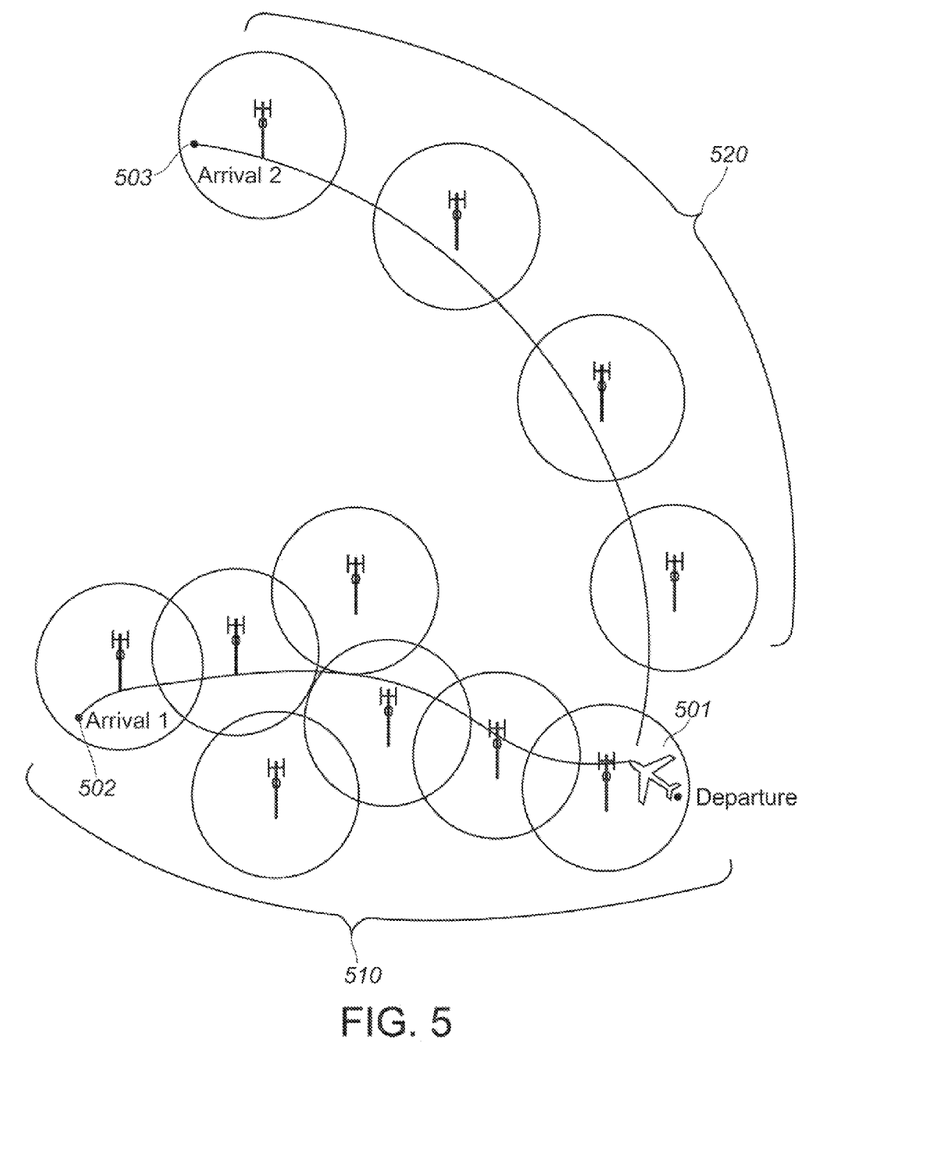
FIG. 5 shows an example of physical ground coverage for two flight paths.

FIG. 5 shows an example of physical ground coverage for two flight paths. Aircraft 501 is shown with two potential flight paths 510 and 520 to two different destinations 501 and 503. As can be seen, flight path 510 passes through a ground cellular network with substantially contiguous ground coverage relevant to the aircrafts intended flight path. Conversely, flight path 520 passes through a ground cellular network that is exhibits substantial coverage gaps over the intended flight path. In the scenario of flight path 510, a proxy unit could select the ground-based cellular network even if a high-continuity QOS application is desired and/or used. However, in the scenario of flight path 520, a proxy unit would automatically and preferably select a more contiguous satellite-based communications network (based on its' preset rules) for a high-continuity QOS/coverage application given the substantial gaps in physical coverage in the ground-based cellular network. In some situations the user may know in advance the coverage challenges from a display of the flight path and may select the type of QOS desired. Additionally, a similar flight path map as shown in FIG. 5 may be displayed on an interactive display in conjunction with the user preferences selection user interface shown in FIG. 3. By including a visual depiction of where and when coverage dropouts might occur for a particular communication system, a user may be better able to make user preference selections. In some instances it may only be desired to show the physical coverage of the air-to-ground communication system, as it would be assumed that the satellite communication system has near universal physical coverage. However, other situations it may be more desirable to show the physical coverage of all available communication systems with reference to the intended flight path.

Figure 6:
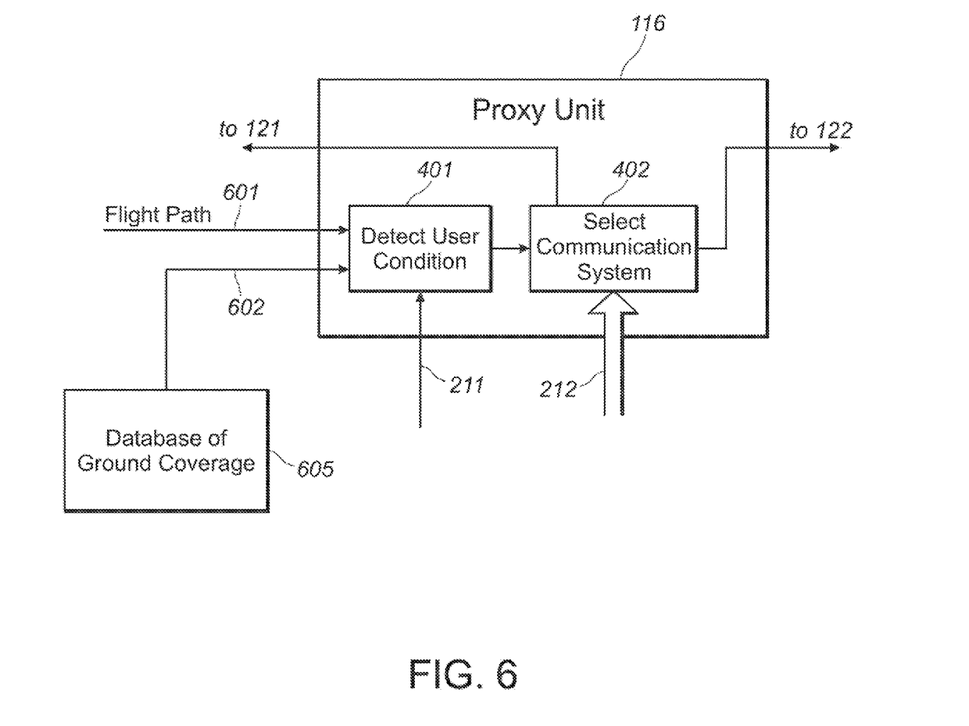
FIG. 6 shows a block diagram of a proxy unit according to another embodiment of the disclosure.

FIG. 6 shows a block diagram of a proxy unit according to another embodiment of the disclosure. This proxy unit is substantially the same as shown in FIG. 4. However, in this embodiment, detection user condition module 401 includes two additional inputs; intended flight/travel path 501 as well as ground coverage information 602 for ground-based communication networks from database 605. The intended flight/travel path 501 may be obtained in any fashion, such as from a flight management system of the aircraft. Ground coverage information database 605 simply stores the physical areas in which one or more of the communication systems have physical coverage. In this way, the detection of the user condition is based both on the contextual use or desire of the user as well as the contextual intended travel path of aircraft through the available networks.

Figure 7:
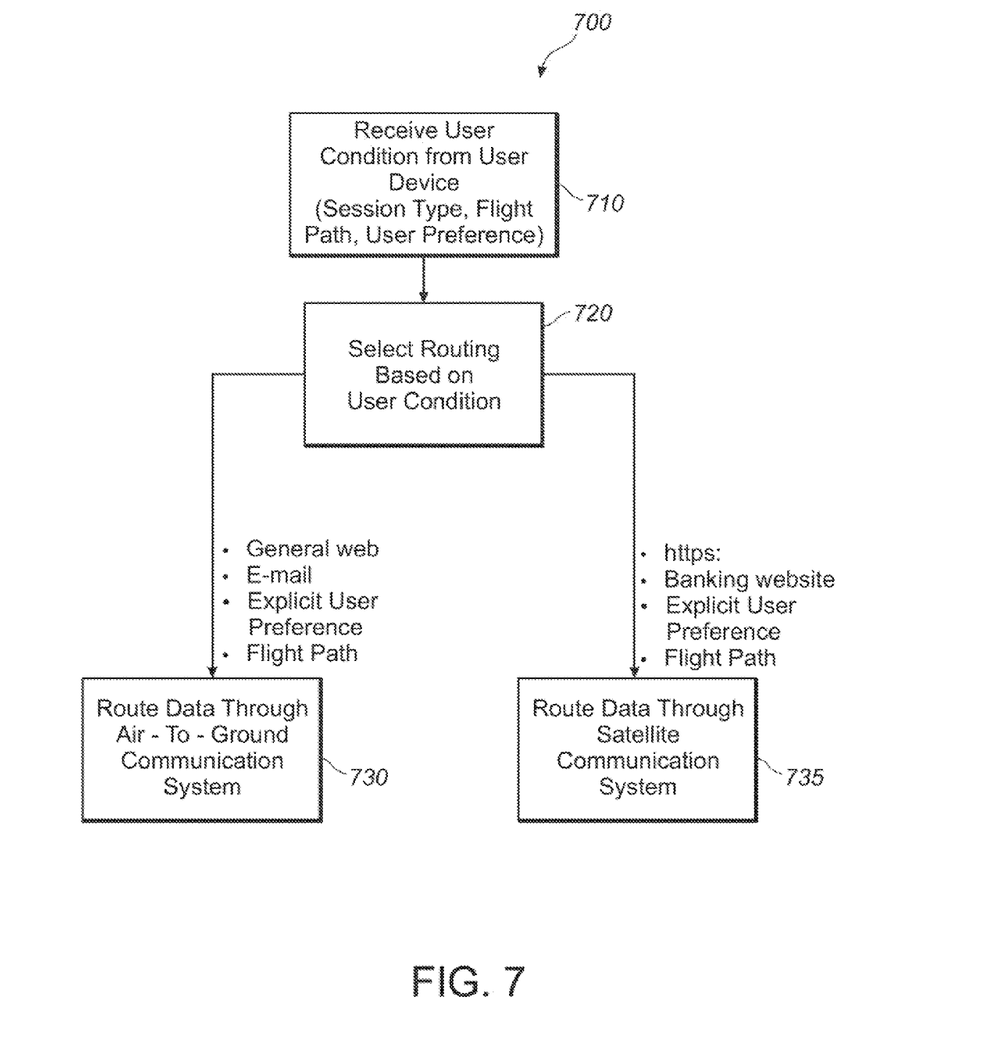
FIG. 7 shows a flowchart of a method according to one embodiment of the disclosure.

The techniques and configurations of the disclosure have so far been described with reference to the aforementioned system. It should be understood, that the techniques described above may also be thought of as a method, and in particular, a computer-implemented method operating on the aforementioned hardware. Such a computer-implemented method may take the form of software operating on a microprocessor, firmware running on a digital signal processor, or the like, as custom built hardware, such as an ASIC, or a combination of the three. FIG. 7 shows a flowchart of a method 700 according to one embodiment of the disclosure. First in step 710, a user condition is received from a user device. As discussed above, the user condition may be a user preference, a session type, and/or a flight path of an aircraft. Next in step 720, a routing of data from a user device to specific communication system is selected based on the user condition.

In step 730, data is routed through an air-to-ground communication system or other communication system with a lower level of contiguous physical coverage. Examples of user conditions that would cause such a routing include detection of a "bursty" type data session (e.g., general web browsing, email, etc.), explicit, user preference selection of air-to-ground communication, and/or an intended flight path that allows for high-continuity connection through the air-to-ground communication system.

In step 740, data is alternatively routed through a satellite communication system or another similar communication system with a higher level of contiguous physical coverage. Examples of user conditions that would cause such a routing include detection of "non-bursty" or secure-type data sessions (e.g., bank websites, SSL, https:, etc.), explicit user preference selection of satellite communication, and/or an intended flight path that does not allow for high-continuity connection through an air-to-ground communication system.

It should be noted that the following disclosed system may utilize any communication band suitable for satellite or air-to-ground communications and is not limited to the 700 MHz and L band RF bands cited. Any cellular or satellite band may be used, including 800; 900, 1800, 1900, 2100, 2300, 2500 MHz cellular bands as well as Ku, Ka, X, and S band satcom bands.

What is claimed is:

1. A data transmission system for transmitting and receiving data comprising:
   a first communication system housed within a communications avionics, the first communications system configured to communicate over a first network;
   a second communication system housed within the communications avionics, the second communications system configured to communicate over a second network, the second network having a more contiguous physical, coverage than the first network;
   a proxy unit collocated with the first communication system and the second communication system within the communications avionics, the proxy unit configured to selectively connect a user device to either the first communication system or the second communication system, the proxy unit configured to dynamically determine a desired communication system from one of: the first communication system and the second communication system, the proxy unit being further configured to selectively connect the user device to the desired communication system based on a user condition, a detection of a session type, a planned travel, path of the user device, and an identification of a session uniform resource locater (URL).

2. The data transmission system of claim 1, wherein the user condition is based on a selection of one or more user preferences and the session type is a Secure Socket Layer (SSL) session.

3. The data transmission system of claim 2, further including an interactive display configured to allow a user to select at least one of the one or more user preferences.

4. The data transmission system of claim 3, wherein the interactive display is a touch screen.

5. The data transmission system of claim 3, wherein the interactive display is configured to display a map of the intended travel path of the user device and to display the physical coverage of at least the first communication system.

6. The data transmission system of claim 2, wherein the one or more user preferences include (1) use of a higher reliability network and (2) use of a higher speed network.

7. The data transmission system of claim 6, wherein the selection of the user preference (1) use of a higher reliability network causes the proxy unit to connect the user device to the second communication system,
   wherein the selection of (2) use of a higher speed network causes the proxy unit to connect the user device to the first communication system, and
   wherein the data transmission system selectively routes data via one of the first communication system and the second communication system and vice versa based on the one or more user preferences.

8. The data transmission system of claim 2, wherein the one or more user preferences indicate a cost of service corresponding to each of the first and second communication systems, and wherein the proxy unit connects the user device to the corresponding communication system based on a selected cost of service.

9. The data transmission system of claim 1, wherein the first communication system is a cellular data network and wherein the second communication system is a satellite communications network.

10. The data transmission system of claim 9, wherein the cellular data network is an LTE network.

11. The data transmission system of claim 1, wherein selectively connecting the user device to the desired communication system based on detection of a session type further comprises detection of:
   a secure type data session causing the proxy unit to connect the user device to the second communication system, and
   a non-secure type data sessions causing the proxy unit to connect the user device to the first communication system.

12. The data transmission system of claim 11, wherein the secure type data session is a Secure Socket Layer (SSL) session.

13. The data transmission system of claim 1, further comprising:
   a database housed within the communications avionics, the database storing physical coverage information for the first communication system,
   an input including a travel path of the user device;
   wherein the proxy unit is configured to compare the travel path of the user device to the physical coverage information to determine if the user device will experience contiguous coverage or non-contiguous coverage while using the first communication system, and
   wherein the proxy unit is configured to connect the user device to the second communication system if the proxy unit determines that the user device will experience non-contiguous coverage while using the first communication system.

14. The data transmission system of claim 13, wherein the data transmission system and the user device are onboard an aircraft.

15. A method for selecting and routing data from or to a user device through a data transmission system comprising the steps of:
   receiving a user condition from the user device;
   detecting a session type;
   receiving a planned travel path of the user device;
   identifying a session uniform resource locater (URL);
   determining, via a proxy unit housed within a communications avionics, a desired communication system from one of: a first communication system and a second communication system, the determining based on: the user condition, the session type, the planned travel path of the user device, and the URL, the first and second communication systems housed within the communications avionics;
   selecting to route data through the desired communication system, the first communication system configured to communicate over a first network or to route data through a second communication system configured to communicate over a second network, the proxy unit configured to dynamically determine wherein the second network has a more contiguous physical coverage than the first network; and
   routing data through the selected communication system.

16. The method of claim 15, wherein the user condition is based on a selection of one more user preferences and the session type is a Secure Socket Layer (SSL) session.

17. The method of claim 16, wherein the one or more user preferences include (1) use of a higher reliability network and (2) use of a higher speed network.

18. The method of claim 17, wherein the selection of the user preference (1) use of a higher reliability network selects the second communication system, wherein the selection of (2) use of a higher speed network selects the first communication system; and wherein the data transmission system selectively routes data via one of the first communication system and the second communication system and vice versa based on the one or more user preferences.

19. The method of claim 15, wherein selecting to route data via the selected network based on detection of a session type further comprises detection of:

a secure type data session causing selection of the second communication system, and a non-secure type data sessions causing selection of the first communication system.

20. The method of claim 19, wherein the secure type data session is a Secure Socket Layer (SSL) session.

* * * * *